US006194706B1

(12) United States Patent
Ressl

(10) Patent No.: US 6,194,706 B1
(45) Date of Patent: Feb. 27, 2001

(54) METHODS AND SYSTEMS FOR LOCATING BURIED FIBER OPTIC CABLES

(75) Inventor: Michael G. Ressl, Western Springs, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/314,314

(22) Filed: May 19, 1999

(51) Int. Cl.[7] .................................................. G01R 31/10
(52) U.S. Cl. ............... 250/225; 250/227.14; 250/227.17; 73/1.85; 324/512; 367/14
(58) Field of Search ..................... 250/225, 227.11, 250/227.14, 227.17; 73/655, 1.85, 649; 324/501, 512; 367/37, 41, 129, 14

(56) References Cited

U.S. PATENT DOCUMENTS

| 4,117,448 | * | 9/1978 | Siems ........................................ 367/79 |
| 4,697,137 | | 9/1987 | Haddon et al. . | |
| 4,927,232 | * | 5/1990 | Griffiths .......................... 250/227.24 |
| 5,070,483 | * | 12/1991 | Berni ........................................ 367/14 |
| 5,106,175 | | 4/1992 | Davis et al. . | |
| 5,114,517 | | 5/1992 | Rippingale et al. . | |
| 5,173,139 | | 12/1992 | Rippingale et al. . | |
| 5,206,065 | | 4/1993 | Rippingale et al. . | |

* cited by examiner

*Primary Examiner*—Stephone B. Allen
(74) *Attorney, Agent, or Firm*—Duft, Graziano & Forest, P.C.

(57) ABSTRACT

The invention provides for assessing location and/or proximity to a buried or submerged optical fiber cable. A seismic generator creates seismic pulses, at known frequencies, on the ground (or water) at a first location and the synchronous rotation of the polarization state of light transmitted through the optical fiber cable is detected. Other seismic pulses are generated at different locations and the polarization rotation is detected at each such location to locate a closest proximity to the cable, corresponding to a minimum or maximum of polarization rotation. A wireless synchronous signal is generated with the seismic pulses to differentially isolate the polarization rotation signal; and, if desired, to further determine distance between the cable and the source of the seismic pulse.

30 Claims, 3 Drawing Sheets

METHODS AND SYSTEMS FOR LOCATING BURIED FIBER OPTIC CABLES

FIELD OF THE INVENTION

The invention relates to determining above-ground proximity to buried fiber optic cables.

BACKGROUND OF THE INVENTION

Utility and telephony companies bury their fiber optic cables. The exact location of these cables oftentimes becomes uncertain because either the installation records are lost or the above ground landmarks change. This uncertainty presents a problem when these companies or others need to access the cables for upgrades and repairs.

In the prior art, the known methods for locating buried fiber optic cables include post-hole drilling and radio-tone transmission. Not only are these methods costly, the risk in accidentally destroying or damaging the buried cable is high because of exploratory earth drilling. In radio toning, several sparsely-spaced holes are typically dug, resulting in low accuracy and possible position misidentification. Radio toning techniques are also becoming obsolete since cables are being replaced with full dielectrics, as opposed to metal cables, and since the technique cannot reach the distances that are possible in modern fiber span transmission lengths.

It is, accordingly, one object of the invention to provide methods for determining the above-ground proximity to buried optical fiber cables. Another object of the invention is to provide systems and methods for locating buried optical fiber cable, relative to an above ground location, through generation of seismic noises on the ground. Yet another object of the invention is to provide methods and systems for determining the distance to a buried fiber optic cable to an above-ground location in near-real time. Still another object of the invention is to locate submerged fiber cables. These and other objects will be apparent in the description which follows.

SUMMARY OF THE INVENTION

U.S. Pat. Nos. 5,206,065, 5,173,139, 5,114,517, 5,106,175 and 4,697,137 provide useful background information for the invention and are thus herein incorporated by reference.

As used herein, "tap" or "optical tap" refer to known mechanisms, such as an optical splitter, which provide for obtaining a signal from a fiber optic cable. Typically, a tap of the invention is one that generates a small signal from a fiber optic cable at a ratio of approximately 1% or less as compared to the entire signal within the cable, so that significant signal traffic energy is not lost through the tap. However, other taps and ratios can be used as appropriate. An optical tap coupled to a silicon photodiode and associated electronics can be used to detect a signal within the cable.

As used herein, a "terminal" refers to a terminal end of a fiber optic cable; and generally exists for purposes of accessing signal traffic on the cable. One can utilize the terminal as a tap, if desired, to obtain polarization rotation information according to the techniques disclosed herein.

The invention of one aspect is a seismometer system that uses the buried or submerged fiber optic cable as part of the system, though the continuous wave (CW) traffic signals on the cable are not affected. An optical power tap connected to the cable (e.g., at a terminal end or connected to some location with the cable) is used to "tap" energy from the cable; and polarization selective optics (e.g., a polarization cube) isolates the polarization state from the tap for purposes of determining a polarization rotation. A seismic source then creates seismic noises or pulses on the surface (e.g., on the ground, for buried cable, or in water for submerged cable) which travel to the cable, momentarily creating micro-bending in the fiber and thus inducing a momentary rotation in the polarization state of light transmitted through the fiber cable. An optical detector and electronics coupled to the polarization optics provide for converting the polarization rotation to an electrical signal indicative of polarization rotation. As the source moves about the surface of the ground or water, the polarization rotation signal is monitored to determine a maximum rotation, thereby determining a closest proximity to the cable.

Fiber optic cables used in telecommunications are typically non-polarized; and thus the polarization state rotates freely within the fiber cable. Connectors and attached network items are generally polarization insensitive for this reason. In accord with the invention, a polarization sensitive element is connected with the cable, e.g., through an optical tap, so that the polarization rotation can be determined without affecting normal traffic signals through the cable. Note, in particular, that buried optical cables are continually bombarded by noises within the ground and yet operate well. The seismic pulse strength generated by the invention is not so large as to cause disruption or damage to the cable.

The invention thus preferably isolates the intentionally induced seismic pulses to a known frequency to improve detection of the synchronized polarization rotations. Specifically, in one aspect, by creating seismic pulses at a known frequency—e.g., one hertz to 100 hertz, or greater (up to fifty kilohertz or more may be desirable when the sonic pulses need to travel through water, in whole or in part, such as when the cable is submerged)—then synchronization electronics coupled to the tap, polarization selective element and optical detector are used to isolate the seismic pulses relative to other background noises. By way of example, if the seismic pulses are created by a jackhammer-like device that strikes the ground at 50 Hz, then the synchronization electronics seek to isolate the 50 Hz signal to maximize the detection of polarization rotation caused by micro-bending of the cable due to the 50 Hz sonic forces imparted to the cable through the ground.

Preferably, in another aspect, a telecommunications signal is transmitted synchronously with the seismic pulses. By comparing the time between (a) the receipt of the telecommunications signal and (b) the detection of the rotation in the polarization state, a distance between the location of the seismic pulse and the cable is determined. If the time is discerned to one nanosecond, the distance accuracy is approximately one foot.

In yet another aspect, a differential-measuring device such as a lock-in amplifier is used to compare the detection of the polarization rotation with the selected frequency, to reduce noise and improve signal detection. Preferably, the measuring device synchronously and differentially compares the detection with the receipt of the telecommunications signal to lock-in and triangulate on the distance between the seismic pulse and the buried cable.

By way of an operational example according to one aspect of the invention, a person moves to a location approximating the location of the buried cable and generates seismic pulses at a known frequency on the ground. These sonic pulses travel through the ground at a speed dependent upon the medium (e.g., earth or water) until they strike the buried or submerged cable, causing micro-bending in the cable. By monitoring the polarization rotation of light transmitted through the cable, the proximity of the location of the person making the seismic pulses relative to the cable is determined. The person roams the ground continuing to make seismic pulses until a maximum polarization rotation is achieved, indicating a location closest to the cable.

Those skilled in the art should appreciate that alternative detection schemes can be used that are within the scope of the invention. For example, electronic phasing can be adjusted so that a minimum signal detection is sought as opposed to a maximum—with the result being that a closest proximity of the person to the cable is determined.

In yet another operational aspect, if the person generates a telecommunications signal synchronously with the seismic pulses, then two signals are received in time and compared: the first signal representing the receipt of the telecommunications signal and the other representing the signal from indicative of the polarization rotation. The smaller the time distance between these signals, the closer the person is to the cable. By estimating the exact transmission speed of the seismic pulses passing through the medium (i.e., sound pulses travel through air at approximately 340 meters/second, while its speed through water or ground is slower), a distance between the person and the cable is determined.

In one aspect, the polarization sensitive element or optics is a Glan-type prism, known in the art. In yet another aspect, the polarization sensitive element connects to a photodiode which produces a signal output proportional to the polarization rotation.

In one preferred aspect, a differential measuring device such as a lock-in amplifier is used to synch the detection of the polarization rotation with the seismic pulse frequency. Preferably, this synchronization is facilitated through a separate signal generated by a telecommunications device such as a cell phone. By way of example, by generating a cellular signal in synch with the seismic pulse, the timed differential receipt of the telecommunications signal and the signal representative of the polarization rotation indicates how far the seismic source is from the fiber cable. Therefore, preferably the (a) telecommunications receiver and (b) electronics receiving the signal representative of the cable's polarization state are co-located, such as at a convenient location above ground.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
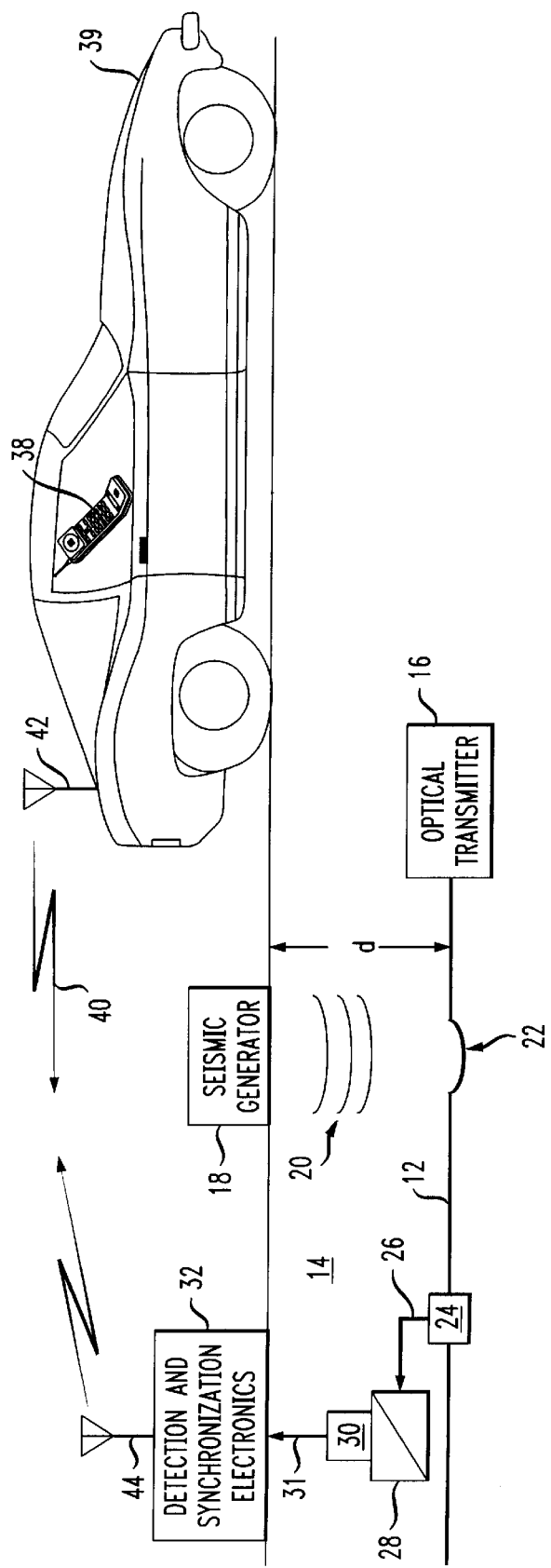
FIG. 1 schematically illustrates one system for determining proximity and distance to buried fiber optic cable, in accord with the invention.

FIG. 1 shows a fiber optic cable proximity locating system 10 constructed according to the invention. FIG. 1 also illustrates one portion of a typical fiber optic cable 12 known in the art and buried within ground 14. Signal traffic is illustratively generated within cable 12 through operation of an optical transmitter 16, also known in the art. By way of example, optical transmitter 16 operates in a larger telecommunications environment to communicate voice and computer data as optical signal traffic within cable 12.

System 10 includes seismic pulse generator 18 (e.g., a pneumatic jack) used to generate one or more seismic pulses on the surface 14a of ground 14. These pulses in turn generate sonic energy 20 within ground 14. Sonic energy 20 strikes cable 12 and creates a micro-bending 22 (shown not-to-scale, for purposes of illustration) in cable 12. Micro-bending 22 within cable 12 alters the polarization state of light transmitted therein. This polarization state is detected by diverting a portion of the light within cable 12, via optical tap 24, onto optical path 26 and by passing the diverted light through a polarization selective element 28, such as a Glan-Thompson prism. The signal strength of light energy passing through element 28 is proportional to the polarization rotation of light within cable 12. An optical detector 30 such as a photodiode converts the optical signal from element 26 into an electrical signal for use as described below. When seismic pulse generator 18 generates pulses at a known frequency, e.g., one hundred hertz, the corresponding signal from detector 30 is transmitted through signal line 31 and processed through detection and signal electronics 32. Such a signal is representatively shown in FIG. 2.

Figure 2:
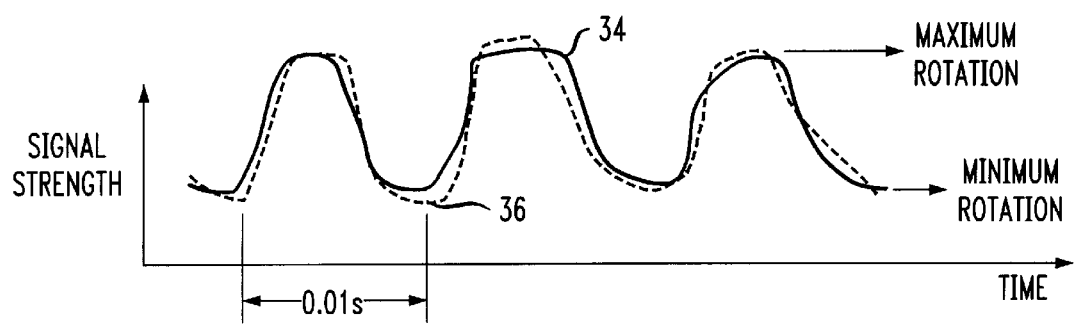
FIG. 2 illustrates a representative polarization rotation signal generated by the system of FIG. 1, and a synchronization signal used to isolate the polarization rotation signal to improve signal to nose.

FIG. 2 illustrates one representative electric signal 34 detected by system 10 and indicative of polarization rotation of light within cable 12. Time is represented on the "x" axis, while signal strength (proportional to polarization rotation) is represented on the "y" axis. Signal 32 is for example a sinusoidal pattern with 0.01 s repeating periods, corresponding to 100 Hz. When the frequency of the pulses 20 is known accurately, e.g., 100 Hz, electronics 32 can generate a comparison signal 36 used to differentially detect signal 34 from other noises within ground 14. Those skilled in the art should appreciate that signal detection generally improves through isolation of detection frequencies, such as through a lock-in amplifier. Preferably, the frequency is selected to match surrounding environmental noises to improve signal detection through cable 12.

Figure 3:
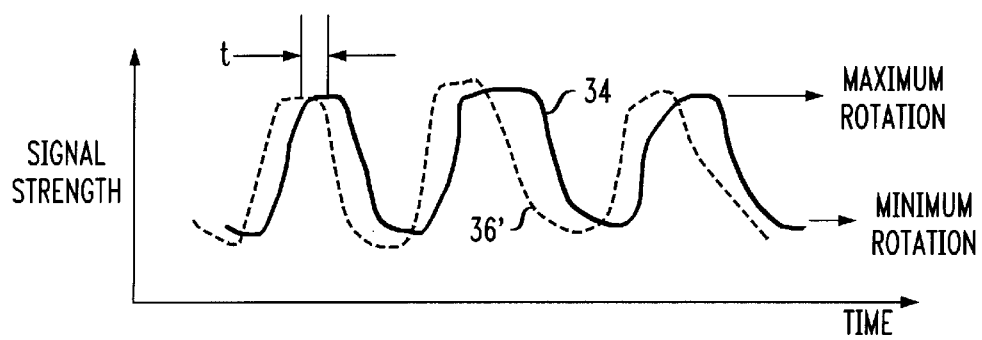
FIG. 3 illustrates a representative polarization rotation signal and a telecommunications synchronization signal generated by the system of FIG. 1, used to differentially detect the polarization rotation signal and to establish distance between the buried fiber optic cable and the ground location generating the seismic pulses.

In a preferred embodiment, however, a second signal 40 is generated by system 10 such as through a wireless link formed by a cellular communications network. As illustrated in FIG. 1, signal 40 can for example be generated by cell phone 38. A vehicle 39 can be used to carry generator 18 and cell phone 38, if desired. Signal 40 is generated synchronously with pulses 20; and sister antenna 44 detects signal 40 for electronics 32. In this preferred embodiment shown in FIG. 3, signal 36' thereby represents signal 40 within electronics 32. As known in the art, signals 34, 36' can be compared to one another to greatly improve signal detection of polarization rotation, even in the presence of noise within ground 14. By way of example, electronics 32 can use function as a lock-in amplifier, known and used extensively in the prior art, for this purpose.

Furthermore, since sonic pulses 20 move more slowly within ground 14, there is a time difference "t" between detection of the polarization rotation and receipt of telecommunications signal 40. Time "t" is used to determine distance "d" between generator 18 and cable 12. Specifically, time "t" divided by the speed of energy 20 in ground 14 is distance "d". This speed can be determined empirically or through known tabular data in the prior art. Soil diffusion should be taken into account in evaluating the speed of energy 20 in ground 14.

Those skilled in the art should appreciate that FIG. 1 can alternatively represent a submerged fiber optic cable 12 within water 14.

Figure 4:
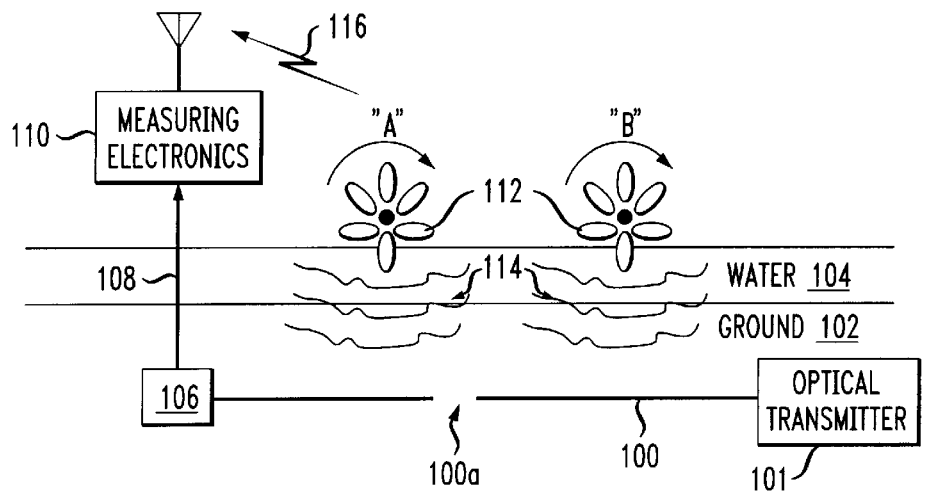
FIG. 4 illustrates a system for determining cable break locations, in accord with the invention.

The invention has several advantages as are apparent in the above description. For example, not only does the invention permit determining proximity to cable 12, it also provides for determining distance to, and isolating breaks in, cable 12. Specifically, by moving around surface 14a and generating pulses 20 at different locations, a break in cable 12 will be determined by a change in polarization rotation and/or a change in signal strength. FIG. 4 illustrates this advantage further. In FIG. 4, fiber optic cable 100 is buried in ground 102 covered by water 104, illustrating a situation similar to swamp land (though those skilled in the art should appreciate that FIG. 4 is illustrative and operates equally well if cable 100 is simply submerged in water 104). An optical transmitter 101 generates signal traffic along cable 100. Cable 100 has a break 100a that disrupts communication along cable 100. Polarization rotation and/or cable signal strength is tapped off of cable 100 at terminal 106; and this information is transmitted along data line 108 to measuring electronics 110. At position "A", pulse generator 112, in the form of a propeller, spins in water 104 to generate sonic pulses 114. Pulses 114 in turn create micro-bending (not shown) in cable 100 to modify the polarization state of light communicated through cable 100. A telecommunications signal 116 can also be generated from position A (and B, respectively) and transmitted to antenna 110a of electronics 110, if desired, to improve detection of the associated polarization rotation signal. As illustrated in FIG. 4, if the generator 112 moves to position "B", then polarization rotation, and/or signal strength within cable 100, will be different because of break 100a. By moving generator 112 around the surface of water 104, the break 100a is thus isolated for repair operations.

Figure 5:
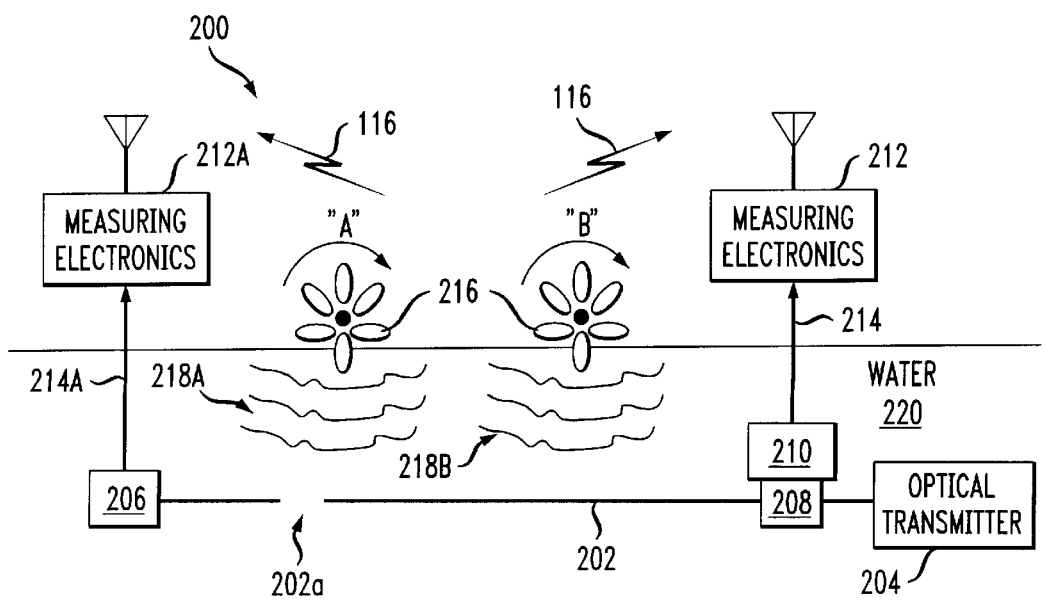
FIG. 5 illustrates an alternative system for determining cable break locations, in accord with the invention.

FIG. 5 illustrates an alternative system 200 for locating breaks in fiber optic cable 202, submerged in water 220, with a break or disruption 202a. For purposes of illustration, optical transmitter 204 sends signal traffic along cable 202 for acquisition at cable terminal 206, and break 202a is shown as a severed cable when in fact cable 202 may be damaged at location 202a, causing disruption in signals transmitted along cable 202. Sound generator 216 creates sonic pulses 218 within water 220 that induce microbending within cable 202 from position "A" and position "B," respectively. This micro-bending is detected by system 200 in two alternative and mutually non-exclusive techniques.

In the first technique, an optical tap 208 and optical detector 210 acquire a signal from cable 202 through known methods; and that signal is communicated to measuring electronics 212 through signal line 214. As generator 216 moves from position "B" towards break 202a, i.e., towards position "A," then sonic pulses 218A produce micro-ending and a polarization rotation in a reflected signal from break 202a that will be sent back to tap 208 and detector 210 for acquisition. This reflected signal will have a polarization rotation, as discussed above, that is detected by measuring electronics 212. Furthermore, the reflected signal can produce a doubling of the polarization rotation due to the 180-degree polarization reflection at break 202a, increasing sensitivity to detecting break 202a. In addition, this polarization rotation signal will essentially disappear after generator 216 moves beyond break 202a, i.e., a position further from position "B" and position "A."

In the second technique, when generator 216 moves to position "A" above break 202a, then pulses 218A actually adjust the alignment in the fibers at disruption 202a, leading to an increase or decrease in the average power transmitted to terminal 206. This change in power is tapped at terminal 206 and sent across signal line 214A to measuring electronics 212A, which detects the change in power, thus identifying the position of break 202a by the location of generator 216.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A method of assessing location, above ground, relative to a buried optical fiber cable, comprising the steps of:
   creating a seismic pulse on the ground at a first location;
   detecting rotation of a polarization state of light transmitted through the optical fiber cable relative to the first location;
   creating a seismic pulse on the ground at one or more additional locations;
   detecting rotation of a polarization state of light transmitted through the optical fiber cable relative to the additional locations; and
   determining a closest location to the buried cable based upon an amount of rotation in the polarization state.

2. A method of claim 1, wherein the steps of detecting comprises utilizing a polarization selective element.

3. A method of claim 1, wherein the steps of creating a seismic pulse comprises creating a series of seismic disturbances on the ground at a selected frequency.

4. A method of claim 3, further comprising selecting the frequency to improve detection of the polarization state relative to other noises present in the ground.

5. A method of claim 3, wherein the frequency is selected between about one and one hundred hertz.

6. A method of claim 3, wherein the frequency is selected between about one hertz and fifty kilohertz.

7. A method of claim 3, wherein the steps of detecting rotation further comprise the steps of synchronizing the detection of the polarization state to the selected frequency.

8. A method of claim 7, wherein the steps of synchronizing comprise the step of differentially comparing the detection of the polarization state with a signal representative of the selected frequency.

9. A method of claim 8, further comprising utilizing a lock-in amplifier in the step of differentially comparing.

10. A method of claim 7, wherein each step of creating a seismic pulse comprises generating a telecommunications signal synchronously with the seismic pulse, and further comprising the step of comparing a time difference between (a) receipt of the telecommunications signal and (b) detecting rotation of the polarization state, to determine a distance between seismic pulse ground location and the buried fiber cable.

11. A method of claim 10, wherein the steps of detecting rotation comprise the step of receiving a signal indicative of the polarization state at a measuring location.

12. A method of claim 11, wherein the step of generating a telecommunications signal comprises utilizing a wireless communications link between the seismic pulse ground location and the measuring location.

13. A method of claim 12, further comprising utilizing a cellular communication link.

14. A method of claim 10, wherein the step of comparing a time difference comprises detecting time differences so as to resolve the distance to approximately one foot.

15. A method of claim 14, wherein the step of comparing a time difference comprises detecting a time difference to approximately one nanosecond.

16. A method of assessing distance above a surface to an optical fiber cable below the surface, comprising the steps of:
    creating a seismic pulse on the surface and generating a telecommunications signal synchronously with the seismic pulse;
    detecting, at a first time, rotation of a polarization state of light transmitted through the optical fiber cable;
    detecting, at a second time, receipt of the telecommunications signal; and
    comparing the first and second times to determine the distance.

17. A method of claim 16, wherein the steps of detecting comprise utilizing a polarization selective element.

18. A method of claim 16, wherein the steps of creating a seismic pulse comprises creating a series of seismic disturbances on the surface at a selected frequency.

19. A method of claim 18, further comprising selecting the frequency to improve detection of the polarization state relative to other noises present below the surface.

20. A method of claim 16, wherein the frequency is selected between about one to fifty kilohertz.

21. A method of claim 16, wherein the steps of detecting rotation further comprise the steps of synchronizing the detection of the polarization state to the selected frequency.

22. A method of claim 16, wherein the steps of synchronizing comprise the step of differentially comparing the detection of the polarization state with a signal representative of the selected frequency.

23. A method of claim 22, wherein the step of comparing further comprises utilizing a lock-in amplifier in synchronizing the detection.

24. A system for determining distance above a surface to an optical cable below the surface, comprising:
    a seismic noise generator for generating seismic pulses on the ground at a select frequency;
    an optical tap connected with the cable; and
    a polarization selective element and an optical detector for sensing a polarization state of light transmitted through the cable and the optical tap, wherein a maximum of the polarization state determines closest proximity of the generator above the ground to the cable.

25. A system of claim 24, wherein the surface comprises ground.

26. A system of claim 24, wherein the surface comprises water.

27. A system for determining distance, above a surface, to an optical cable below the surface, comprising:
    a seismic noise generator for generating seismic pulses on the surface at a select frequency;
    a telecommunications device for generating a telecommunications signal synchronously with the pulses;
    an optical tap connected with the cable;
    a polarization selective element and an optical detector for sensing a polarization state of light transmitted through the cable and the optical tap at a first time;
    a detector for receiving the telecommunications signal at a second time; and
    synchronization electronics to improve detection of polarization states with respect to external noise and to quantify a time difference between the first and second times to determine the distance.

28. A system of claim 27, wherein the synchronization electronics comprise a lock-in amplifier.

29. A system of claim 27, wherein the telecommunications device comprises a cellular phone.

30. A method of assessing location, above water, relative to a submerged optical fiber cable having at least one terminal, comprising the steps of:
    creating a seismic pulse on the water at a first location;
    detecting rotation of a polarization state of light transmitted through the optical fiber cable relative to the first location;
    generating a seismic pulse in the water at one or more additional locations; and
    detecting rotation of a polarization state of light transmitted through the optical fiber cable relative to the additional locations; and
    determining a closest location to the buried cable based upon an amount of rotation in the polarization state.

* * * * *